United States Patent
Yamashirodani

(10) Patent No.: US 9,652,080 B2
(45) Date of Patent: May 16, 2017

(54) DISPLAY AND INPUT DEVICE AND IMAGE FORMING APPARATUS INCLUDING THE SAME

(71) Applicant: KYOCERA Document Solutions Inc., Osaka (JP)

(72) Inventor: Masayuki Yamashirodani, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 42 days.

(21) Appl. No.: 14/811,499

(22) Filed: Jul. 28, 2015

(65) Prior Publication Data
US 2016/0034105 A1 Feb. 4, 2016

(30) Foreign Application Priority Data
Jul. 29, 2014 (JP) .................. 2014-153982

(51) Int. Cl.
*G06F 3/12* (2006.01)
*G06F 21/30* (2013.01)
(Continued)

(52) U.S. Cl.
CPC .................. *G06F 3/0418* (2013.01)

(58) Field of Classification Search
CPC .... G06F 3/1204; G06F 3/0488; G06F 3/0412; G06F 21/30
See application file for complete search history.

(56) References Cited

U.S. PATENT DOCUMENTS

| 2002/0126102 A1* | 9/2002 | Redmayne .......... G06F 3/04886 345/173 |
| 2009/0066644 A1* | 3/2009 | Endoh .................. G03G 15/502 345/157 |

(Continued)

FOREIGN PATENT DOCUMENTS

| JP | 2001-092596 A | 4/2001 |
| JP | 2015-043195 A | 3/2015 |

OTHER PUBLICATIONS

An Office Action; "Notice of Reasons for Rejection," issued by the Japanese Patent Office on Aug. 3, 2016, which corresponds to Japanese Patent Application No. 2014-153982 and is related to U.S. Appl. No. 14/811,499.

*Primary Examiner* — Lin Li
(74) *Attorney, Agent, or Firm* — Studebaker & Brackett PC

(57) ABSTRACT

A display and input device includes a display section, touch screen section, control section, and storage section. The display section displays thereon a screen image including an operation element image. The touch screen section detects a touch position on the screen image. The control section detects a set of touch position coordinates based on output from the touch screen section. The storage section stores therein detection coordinate data showing coordinate values associated with possible output values of the touch screen section, and a predetermined number of sets of touch position coordinates detected. On detecting a touch in a non-operable region the predetermined number of times in succession, the control section displays a target point image on the display section, determines an amount of deviation between the detected coordinates and the display coordinates of the target point image, and calibrates the detection coordinate data in accordance with the amount of deviation.

8 Claims, 11 Drawing Sheets

(51) Int. Cl.
*G06F 3/048* (2013.01)
*G03G 15/043* (2006.01)
*G03G 15/00* (2006.01)
*G06F 3/041* (2006.01)

(56) References Cited

U.S. PATENT DOCUMENTS

| | | | |
|---|---|---|---|
| 2010/0226672 A1* | 9/2010 | Ogasahara | G03G 15/0435 |
| | | | 399/51 |
| 2012/0075653 A1* | 3/2012 | Takai | G03G 15/502 |
| | | | 358/1.13 |
| 2013/0038540 A1* | 2/2013 | Anderson | G06F 3/0488 |
| | | | 345/173 |
| 2013/0070274 A1* | 3/2013 | Hayamizu | G06F 3/1204 |
| | | | 358/1.13 |
| 2013/0154974 A1* | 6/2013 | Murata | G06F 3/0488 |
| | | | 345/173 |
| 2015/0324557 A1* | 11/2015 | Kato | G06F 21/30 |
| | | | 726/16 |

\* cited by examiner (Before calibration)

| Output (horizontal axis) | Coordinate (horizontal axis) | Output (vertical axis) | Coordinate (vertical axis) |
|---|---|---|---|
| Ax1 | X1 | Ay1 | y1 |
| ⋮ | ⋮ | ⋮ | ⋮ |

(After calibration)

| Output (horizontal axis) | Coordinate (horizontal axis) | Output (vertical axis) | Coordinate (vertical axis) |
|---|---|---|---|
| Vx1 | X1+α | Vy1 | y1+β |
| ⋮ | ⋮ | ⋮ | ⋮ |

# DISPLAY AND INPUT DEVICE AND IMAGE FORMING APPARATUS INCLUDING THE SAME

INCORPORATION BY REFERENCE

The present application claims priority under 35 U.S.C. §119 to Japanese Patent Application No. 2014-153982 filed Jul. 29, 2014. The contents of this application are incorporated herein by reference in their entirety.

BACKGROUND

The present disclosure relate to a display and input device having a display section and a touch screen section and also relates to an image forming apparatus that includes such a display and input device.

Electric and electronic devices may be equipped with a display panel. A typical display panel incorporates a touch screen used to input settings or perform operations on the device. The display panel displays images of keys, buttons, tabs, and so on used for various settings. When a user performs a touch operation, the touch screen detects the touch position and compares the coordinates specifying the touch position with the display coordinates of the images of keys, buttons, tabs, and so on to determine an image that is operated. In this way, the display panel receives inputs made by the user for various settings. Unfortunately, the coordinates of a position actually touched on a screen by a user may not precisely correspond to the position (coordinates) detected as the touch position by the device (system). The deviation between the actual touch position (coordinates) by the user and the detected coordinates (position) by the device (system) may result in that the key touched by the user is not correctly determined as the operated key (In the following description, such a deviation may be referred to as a "deviation between the actual touch position coordinates and the detected touch position coordinates"). One known example discloses a technique for calibrating the deviation between the actual touch position coordinates and the detected touch position coordinates.

More specifically, the example discloses a touch panel device that includes a display section and a touch screen layered on the display section. The touch panel device has a function of converting values detected for a touch position on the touch screen into coordinates specifying the touch position on the display section and also has a calibration function. With the calibration function, the touch panel device first acquires a translation calibration value between the coordinates of a first reference point displayed on the display section and the coordinates detected for a touch operation on the first reference point. The touch panel device additionally acquires a rotation calibration value between the coordinates of a second reference point displayed on the display section and the coordinates detected for a touch operation on the second reference point, with the first reference point taken as the center of rotation. The touch panel device then calibrates the coordinates detected for a touch position through calibration based on the rotation calibration value in addition to the translation calibration value. This configuration enables the calibration to correct the deviation of detection resulting from that the touch screen is twisted relative to a specific reference point on the display device.

SUMMARY

A display and input device according to the present disclosure includes a display section, a touch screen section, a control section, and a storage section. The display section displays thereon a screen image including one or more operation element images each operable to cause switching of the screen image and a non-operable region in which no operation element image is present. The touch screen section detects a touch position on the screen image. The control section detects a set of touch position coordinates of the touch position based on output from the touch screen section, compares the detected touch position coordinates with image data of the screen image displayed on the display section to determine that when a display position of any of the operation element images overlaps the detected touch position coordinates, the overlapping operation element image is operated, and controls the display section to switch the screen image according to the operation element image operated. The storage section stores therein detection coordinate data showing coordinate values associated with possible output values of the touch screen section and at least a predetermined number of sets of touch position coordinates detected in succession including a set of touch position coordinates most recently detected. On detecting a touch operation in the non-operable region the predetermined number of times in succession, the control section displays on the display section a target point image for calibrating coordinate detection, determines an amount of deviation between a set of touch position coordinates detected after display of the target point image and a set of display coordinates of the target point image, and calibrates the detection coordinate data such that each set of touch position coordinates subsequently detected is corrected in accordance with the amount of deviation.

DETAILED DESCRIPTION

The following describes an embodiment with reference to FIGS. 1 to 12. In the following description, a multifunction peripheral 100 (corresponding to an image forming apparatus) that includes an operation panel 1 (corresponding to a display and input device) is described as an example. However, the matters described in the present embodiment, such as configuration and placement of components, are merely an example for illustration and not to limit the scope of the disclosure.

Overview of Image Forming Apparatus

Figure 1:
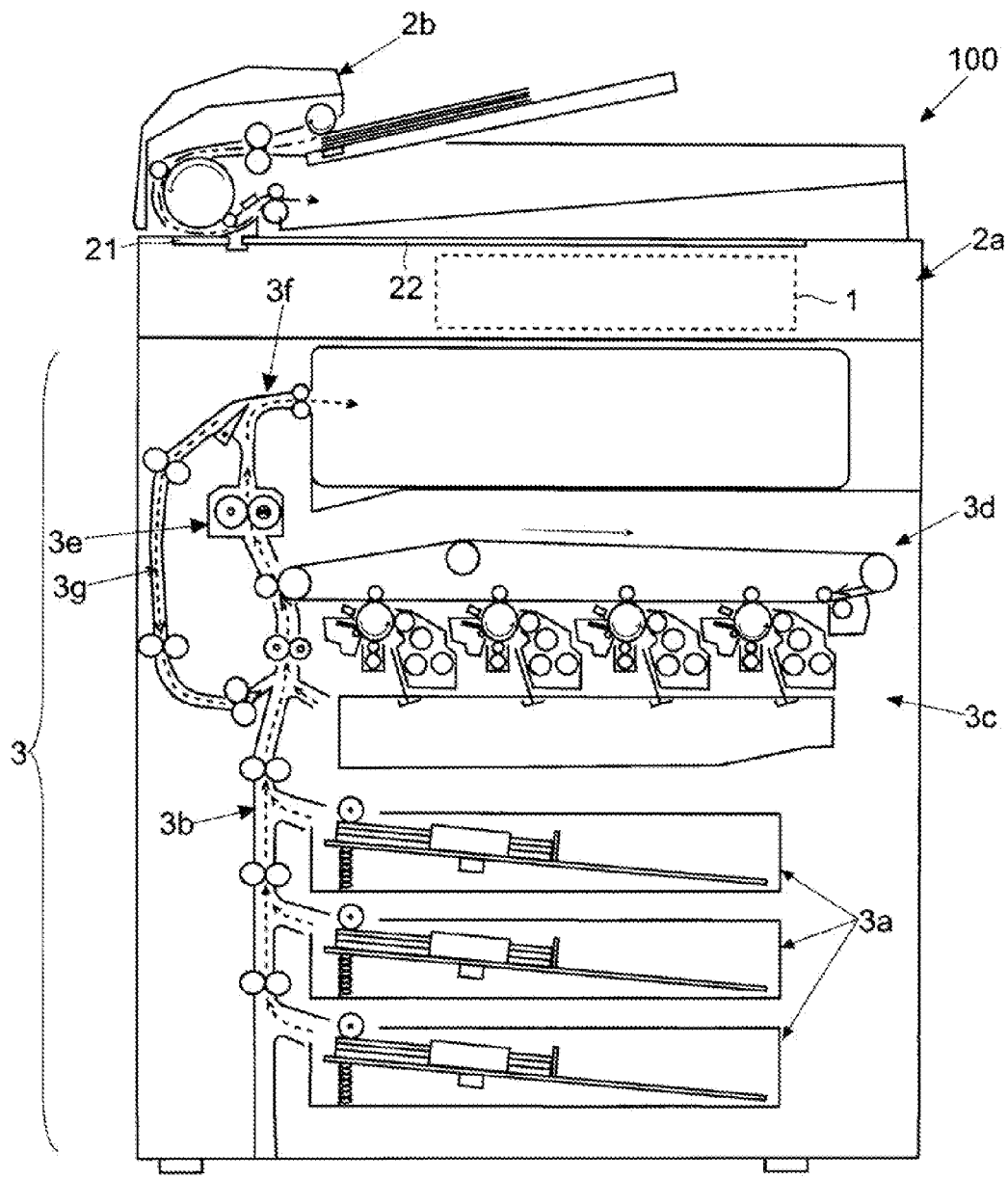
FIG. 1 shows an example of a multifunction peripheral of an embodiment.

First, an overview of the multifunction peripheral 100 according to the present embodiment is described with reference to FIG. 1. FIG. 1 shows an example of the multifunction peripheral 100 according to the present embodiment.

As shown in FIG. 1, the multifunction peripheral 100 is provided with the operation panel 1 disposed at the front. The operation panel 1 is used for making various settings relevant to the multifunction peripheral 100 (the details of the operation panel 1 will be described later). The multifunction peripheral 100 is additionally provided with an image reading section 2a and a document feeding section 2b disposed at the top. The multifunction peripheral 100 is also provided with a printing section 3 inside. The printing section 3 includes a plurality of paper feeding sections 3a, a conveyance section 3b, an image forming section 3c, an intermediate transfer section 3d, a fixing section 3e, a discharge conveyance section 3f, and a duplex printing conveyance section 3g.

The document feeding section 2b automatically feeds sheets of a document one by one to the position of reading coordinates (to a feed-reading contact glass 21). The image reading section 2a reads a document sheet passing over the feed-reading contact glass 21 or a document sheet placed on a stationary reading contact glass 22 to generate image data.

Each of the paper feeding sections 3a stores a plurality of sheets of paper and feeds one sheet at a time to the conveyance section 3b for printing. The conveyance section 3b conveys a sheet fed from any of the paper feeding sections 3a. The image forming section 3c forms toner images of respective colors based on the image data. The intermediate transfer section 3d receives the toner images transferred from the image forming section 3c through a primary transfer process and performs a secondary transfer process of the toner images to a sheet. The fixing section 3e fixes the toner images transferred to the sheet. The sheet output from the fixing section 3e is forwarded toward the exit tray 34. The discharge conveyance section 3f coveys a printed sheet either toward the exit tray 34 or toward the duplex printing conveyance section 3g. The duplex printing conveyance section 3g conveys a sheet having been printed on one side to a location upstream of the image forming section 3c in terms of the sheet conveyance direction.

Operation Panel 1

Figure 2:
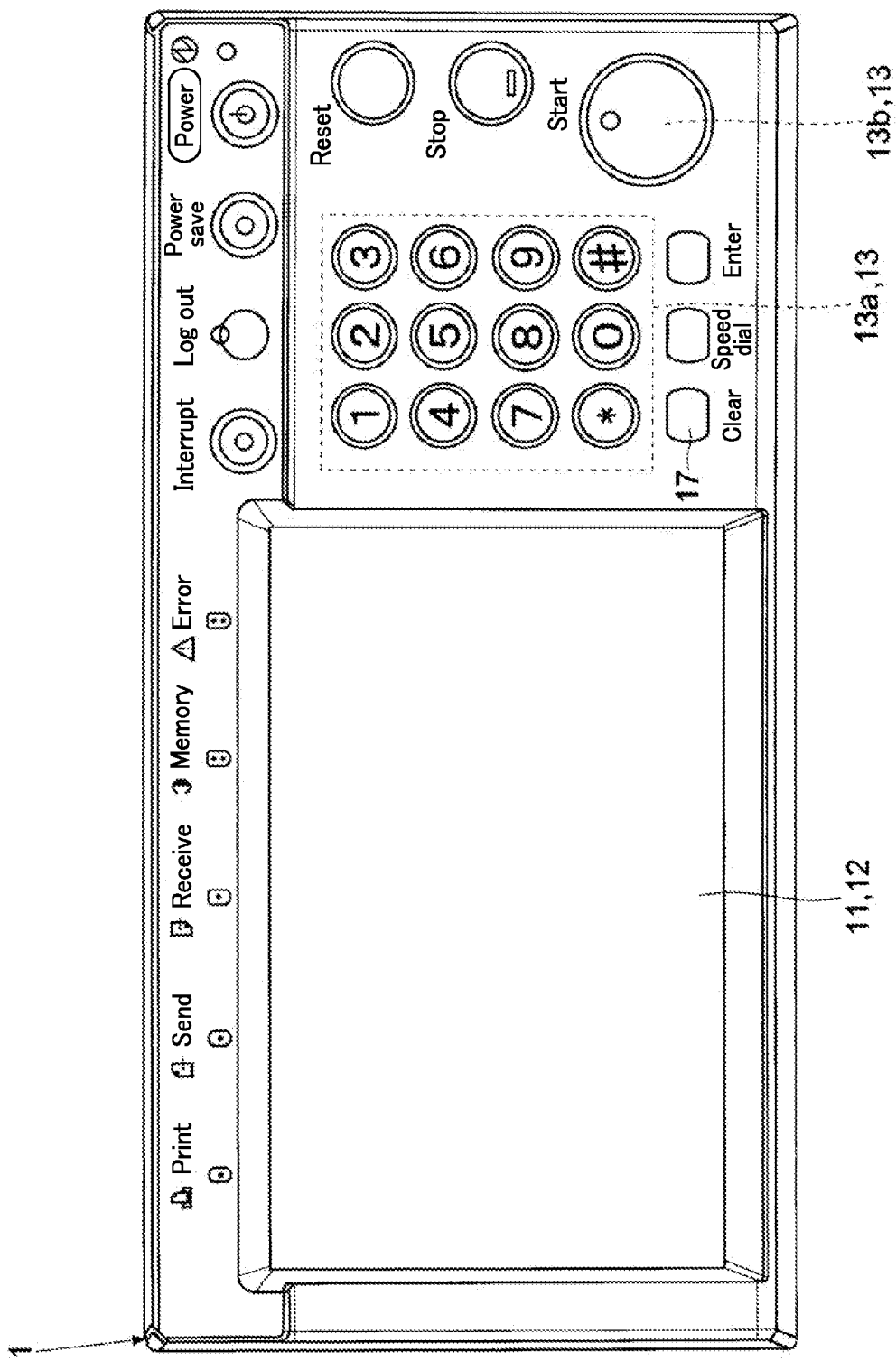
FIG. 2 shows one example of an operation panel 1.

Next, with reference to FIG. 2, an example of the operation panel 1 according to the present embodiment is described. FIG. 2 shows one example of the operation panel 1.

The operation panel 1 includes a display section 11, a touch screen section 12, and hard keys 13. The hard keys 13 are used to select the functions of the multifunction peripheral 100, such as a copy function and a transmission function. Examples of the hard keys 13 include a ten-key pad 13a and a start key 13b for instructing the start of copying or other jobs.

The display section 11 may for example be a liquid crystal display panel. The display section 11 may alternatively be a different type of a display panel such as an organic electroluminescence display panel. The display section 11 displays menus, keys, and tabs used for settings of the multifunction peripheral 100. In other words, the display section 11 displays a screen image including operation element images each operable to cause switching of the screen image to another screen image. The operation element images may be representations of, for example, menus, tabs, keys, and buttons. By selecting the operation element images displayed on the display section 11, the user can input various settings of the multifunction peripheral 100. The display section 11 also displays various other element images and screen images, including a status message indicating the status of the multifunction peripheral, for example.

The touch screen section 12 is layered on the top of the display section 11. The touch screen section 12 is disposed in cooperative relation with the display section 11 and detects a touch position (a set of coordinates) on the screen image displayed. The touch screen section 12 compares the set of coordinates detected as the touch position with the sets of coordinates describing the respective regions (display regions) of keys displayed to and specifies a key that is touched by the user, thereby receiving an input from the user. As the touch screen section 12, a projected capacitive touch screen or a resistive touch screen may be used.

Hardware Configuration of Multifunction Peripheral 100 and Other Components

Figure 3:
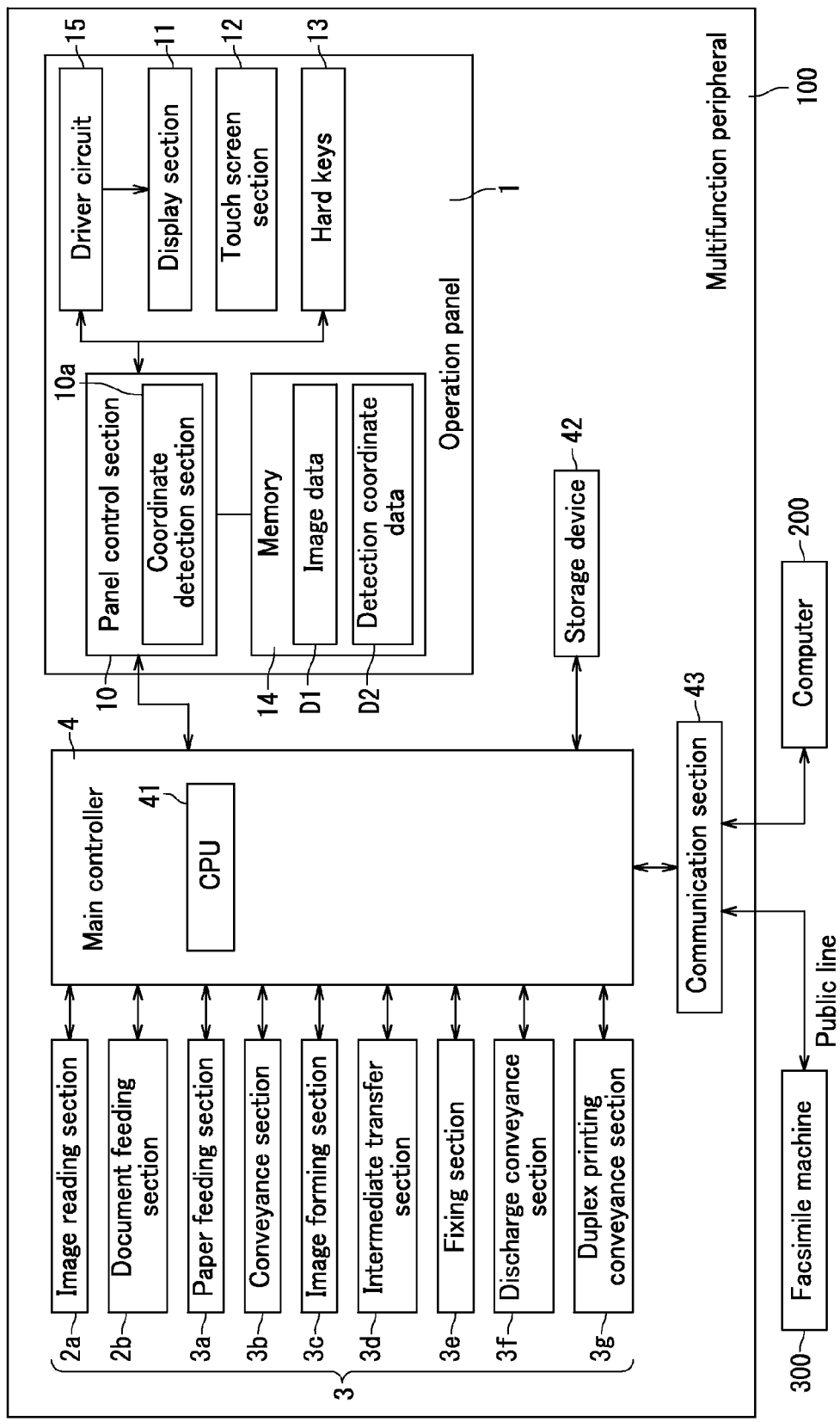
FIG. 3 shows an example of the hardware configuration of the multifunction peripheral.

Next, with reference to FIG. 3, an example of the hardware configuration of the multifunction peripheral 100 according to the present embodiment is described. FIG. 3 shows an example of the hardware configuration of the multifunction peripheral 100.

The multifunction peripheral 100 further includes a main controller 4, a storage device 42, and a communication section 43. In one example, the main controller 4 is connected to the operation panel 1, the document feeding section 2b, the image reading section 2a, and the printing section 3 and executes their control.

In one example, the main controller 4 includes one or more control elements, including a CPU 41. The CPU 41 performs computing and other operations based on a control program to control the components of the multifunction peripheral 100. The control program is stored in the storage device 42 and decompressed. The main controller 4 may be formed from a plurality of control sections, including a main control section and an engine control section, that are separately provided for different functions. The main control section performs overall control and image processing. The engine control section controls printing operation through, for example, ON/OFF control of the motors for driving the rotary members included in the printing section 3. In the present disclosure, such control sections are collectively configured and described as the main controller 4.

The storage device 42 is connected to the main controller 4. The storage device 42 is implemented through a combination of non-volatile and volatile memory devices, such as read-only memory (ROM), random-access memory (RAM), and hard disk drive (HDD). The storage device 42 stores various data for the multifunction peripheral 100, including control programs, control data, setting data, and image data.

The communication section 43 functions as an interface that is provided with various types of connectors, a socket, and a FAX modem. The communication section 43 is connected to the main controller 4. The communication section 43 connects via a network or public line the multifunction peripheral 100 to a plurality of external computers 200 (for example, personal computers and servers) and also with facsimile machines 300 on the other end of communication. The main controller 4 can therefore perform the box function, scanner function, printer function, facsimile function, and so on. Execution of the box function allows storage of image data acquired by the image reading section 2a into the storage device 42. Execution of the scanner or facsimile function allows transmission of image data acquired by the image reading section 2a to an external computer 200 or a facsimile machine 300 on the other end of communication. Execution of the printer or facsimile function allows reception of image data transmitted from an external computer 200 or a facsimile machine 300 on the other end of communication and input of the received image data into the multifunction peripheral 100. Then, the image data may be subject to printing or facsimile transmission. For the convenience, FIG. 3 only shows one computer 200 and one facsimile machine 300, which is on the other end of communication.

The main controller 4 detects an input made on the operation panel 1 and controls the multifunction peripheral 100 to execute jobs such as copying or scanning according to the settings input by the user. The operation panel 1 according to the present embodiment includes, in addition to the display section 11, the touch screen section 12, and the hard keys 13, a panel control section 10 (corresponding to a control section), a memory 14 (corresponding to a storage section), and a driver circuit 15.

The panel control section 10 includes a CPU and ICs. The panel control section 10 controls display of the display section 11. Additionally, the panel control section 10 detects the set of coordinates specifying a position that is determined to be touched, based on output from the touch screen section 12. The panel control section 10 then compares the detected set of coordinates with image data D1 of a screen image displayed on the display section 11 and determines that an operation element image displayed at a position overlapping the detected set of coordinates is operated. The panel control section 10 controls the display section 11 to switch the screen image according to the operation element image operated.

Through operations in a normal mode, a user selects a function from among the functions of the multifunction peripheral 100 (such as the copy function, transmission function, and box function) and subsequently selects setting items selectable for the selected function (for the copy function, for example, items such as enlarging/reducing, density, page combine, and duplex are selectable). To set values for the selected setting item, the user repeats operation (selection) of keys on the screen images displayed one by one on the display section 11 in response to a previously selected key, starting from the screen image at the top of the hierarchal structure of the screen images. Each time a key is operated (selected), the panel control section 10 switches the screen image displayed on the display section 11 to a different screen image. Eventually, the setting of values for the function selected by the user completes. The panel control section 10 recognizes that the settings for the function is made and transmits the settings to the main controller 4. Consequently, the main controller 4 controls the relevant sections, such as the image forming section 3c, to perform the selected function according to the settings made on the operation panel 1. As a result, the job, such as printing, is carried out as intended by the user.

The image data D1 of screen images displayed on the display section 11 is stored for example in the memory 14 provided in the operation panel 1. The panel control section 10 therefore reads from the memory 14 a piece of image data D1 corresponding to a screen image to be displayed next according to the key displayed at the coordinates touched by the user. Alternatively, the image data D1 of screen images to be displayed on the display section 11 may be stored in the storage device 42. In this case, the operation panel 1 reads the image data D1 from the storage device 42. Regardless of the storage location of the image data D1, the panel control section 10 issues instructions to the driver circuit 15 that actually controls the display section 11 to cause the display section 11 to display a screen image based on the image data D1. The driver circuit 15 is an integrated circuit (IC) for a liquid crystal driver in the case where the display section 11 is a liquid crystal display panel. The operation panel 1 may be without the panel control section 10 and the memory 14. Instead, other components of the main controller 4 (the CPU 41 or the storage device 42) may perform the functions of the panel control section 10 and the memory 14.

The panel control section 10 includes a coordinate detection section 10a (coordinate detection circuit). The coordinate detection section 10a detects a set of coordinates specifying a position that is determined to be touched, based on output from the touch screen section 12. The coordinate detection section 10a may for example be an IC for detecting a touch position (a set of touch position coordinates).

In the case where the touch screen section 12 is a resistive touch screen, the coordinate detection section 10a performs analog-to-digital (A/D) conversion of signals indicating analog voltages output from the touch screen section 12 alternatively for a coordinate on the vertical axis and a coordinate on the horizontal axis. The signals indicating the vertical axis coordinates and the horizontal axis coordinates are stored in the memory 14. The coordinate detection section 10a detects the set of coordinates (position) of a position that is determined to be touched, based on detection coordinate data D2 that shows coordinate values associated with possible output values of the touch screen section 12. In the case where the touch screen section 12 is a projected capacitive touch screen, the coordinate detection section 10a detects the capacitance variations on the touch screen section 12 and detects the set of coordinates (position) of a position that is determined to be touched, with reference to the capacitance values on the vertical and horizontal axis coordinates based on the detection coordinate data D2 stored in the memory 14.

Among the components of the operation panel 1, the coordinate detection section 10a may be included in the operation panel 1 separately from the panel control section 10.

The memory 14 (corresponding to the storage section) stores the detection coordinate data D2. The memory 14 includes ROM (flash ROM, for example) and RAM. The panel control section 10 compares the detected set of touch position coordinates with the image data D1 corresponding to the screen image being displayed on the display section 11 at the time of the touch operation and determines an operation element image displayed at the detected set of touch position coordinates. Through this operation, the panel control section 10 identifies the key, button, or tab selected by the user.

Function Selection and Setting Screen

Figure 4:
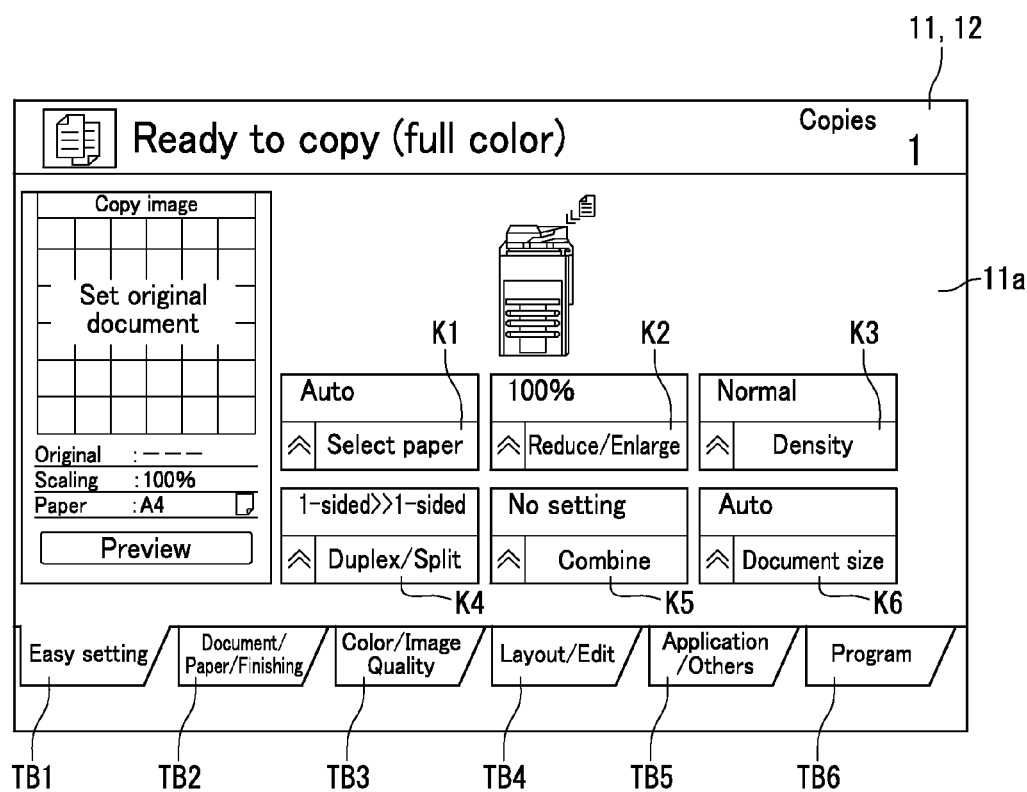
FIG. 4 shows one example a top-level setting screen for a copy function.

Next, with reference to FIG. 4, the following describes a setting screen displayed on the operation panel 1 according to the present embodiment. FIG. 4 shows one example a top-level setting screen 11a for a copy function.

The panel control section 10 displays a screen image on the display section 11. Each image screen is used by a user to select a function to be executed and a setting item related to the selected function and also to enter a value for the selected setting item.

The top-level setting screen 11a is displayed on the display section 11 as the first screen displayed when a key associated with a copy function is operated on the home screen (not shown), for example. The operation panel 1 may be provided with the hard keys 13. When a hard key 13 associated with the copy function is operated, the panel control section 10 displays the top-level setting screen 11a on the display section 11.

In an example shown in FIG. 4, the top-level setting screen 11a for the copy function includes easy setting keys K1 to K6. The easy setting keys K1 to K6 are provided for frequently selected setting items. The easy setting key K1 may for example be associated with the setting items relevant to "paper selection". The easy setting key K2 may for example be associated with the setting items relevant to "enlarging/reducing".

Some setting items (such as the frame erase settings, the margin settings, the reading resolution settings, and the document-type settings) are not displayed on the top-level setting screen 11a shown in FIG. 4. These setting items are displayed in response to a touch on the display coordinates of a corresponding tab from among a document/paper/finishing tab TB2, a color/image quality tab TB3, a layout edit tab TB4, an application/other settings tab TB5, and a program tab TB6 that are displayed in a row with the easy setting tab TB1. Each setting item is associated in advance with one of the tabs. In response to a touch operation on a tab, the panel control section 10 displays a corresponding setting screen on the display section 11. Each setting screen shows an array of setting keys related to the operated tab.

For example, in response to a touch operation in the display region corresponding to the document/paper/finishing tab TB2, the panel control section 10 displays on the display section 11 a screen image that includes setting keys associated with setting items related to the document and paper, such as the document size, paper size, document/paper orientations, and the paper feed source. In response to a touch operation in the display region corresponding to the color/image quality tab TB3, the panel control section 10 displays on the display section 11 a screen image that includes setting keys associated with setting items related to the color and image quality, such as a printing color (color or monochrome), resolutions, density adjustment for the respective colors (black, cyan, magenta, and yellow). In response to a touch operation in the display region corresponding to the layout edit tab TB4, the panel control section 10 displays on the display section 11 a screen image that includes setting keys associated with setting items related to the image layout and image data editing, such as the page combine printing and the duplex printing. In response to a touch operation in the display region corresponding to the application/other settings tab TB5, the panel control section 10 displays on the display section 11 a screen image that includes setting keys associated with advanced setting items, such as the margin size adjustment and the frame erase function. In response to a touch operation in a display region corresponding to the program tab TB6, the panel control section 10 displays on the display section 11 a screen image allowing the user to select programs registered in advance. A program registered may for example be a collection of one or more pre-programmed setting values that can be input at a single touch.

The user touches a position (region) where a tab of interest is located in a screen image and then touches a position (region) where a setting key of interest is located on a screen image subsequently displayed. As above, the panel control section 10 displays a setting screen relevant to the setting item selected by the user. When for example the user selects a setting item associated with the page combine printing, a setting screen relevant to the page combine printing is displayed to allow the user to input values specifying the 2-in-1 or 4-in-1 setting and an edge line setting. In a manner described, a screen displayed on the display section 11 is switched from one another to allow the user to input values for the setting items of interest.

Deviation between Touch Position and Detected Coordinates

Figure 5:
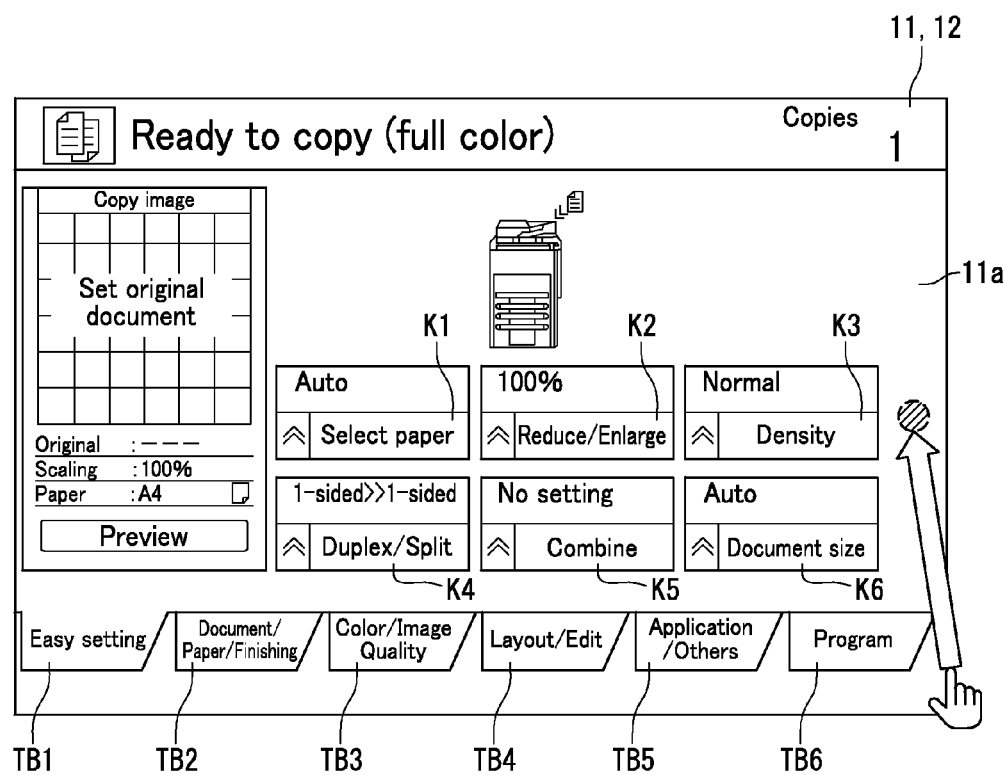
FIG. 5 shows an example of a deviation between the coordinates of an actual touch position and the coordinates detected for the touch position.

Next, with reference to FIG. 5, a deviation between the actual touch position coordinates and the detected touch position coordinates is described. FIG. 5 shows one example of a deviation between the actual touch position coordinates and the detected touch position coordinates.

Due to various factors, including deteriorations with time and abnormalities in circuitry, the set of coordinates detected as a position touched by a user may not precisely correspond to the set of coordinates of a position actually touched by the user.

In the example shown in FIG. 5, although the user touches a display position (display region) of the program tab TB6, the set of touch position coordinates detected by the panel control section 10 based on the output of the touch screen section 12 specifies a position outside the program tab TB6. In other words, in the example shown in FIG. 5, although the program tab TB6 is the operation element image that is operated, the panel control section 10 erroneously detects as the touch position the set of coordinates specifying a poison where no operation element image is displayed. Note that a set of coordinates essentially defines a point. For the convenience sake, however, FIG. 5 shows a shaded circular region to represent the touch position coordinates erroneously detected by the panel control section 10.

Correction of Detection Coordinate Data D2

Figure 6:
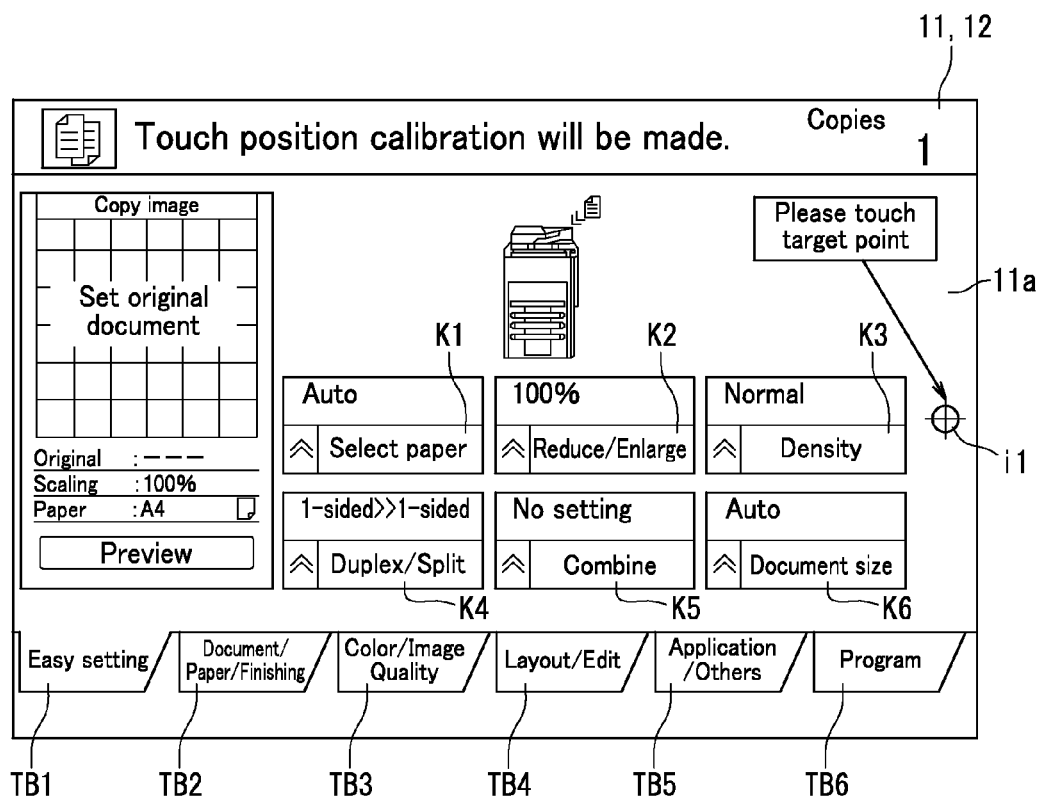
FIG. 6 shows an example of a display section on which a target point image is displayed.
Figure 7:
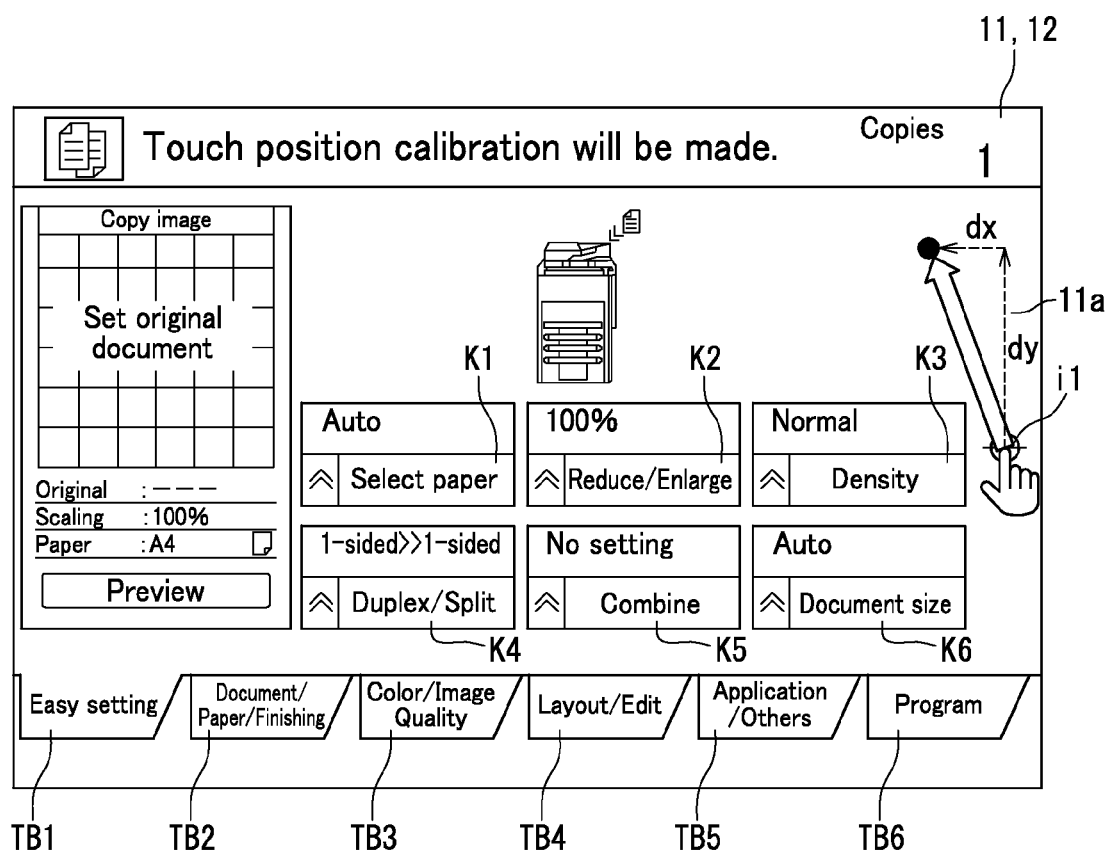
FIG. 7 illustrates an example of how an amount of deviation is determined.
Figures 8, 9:
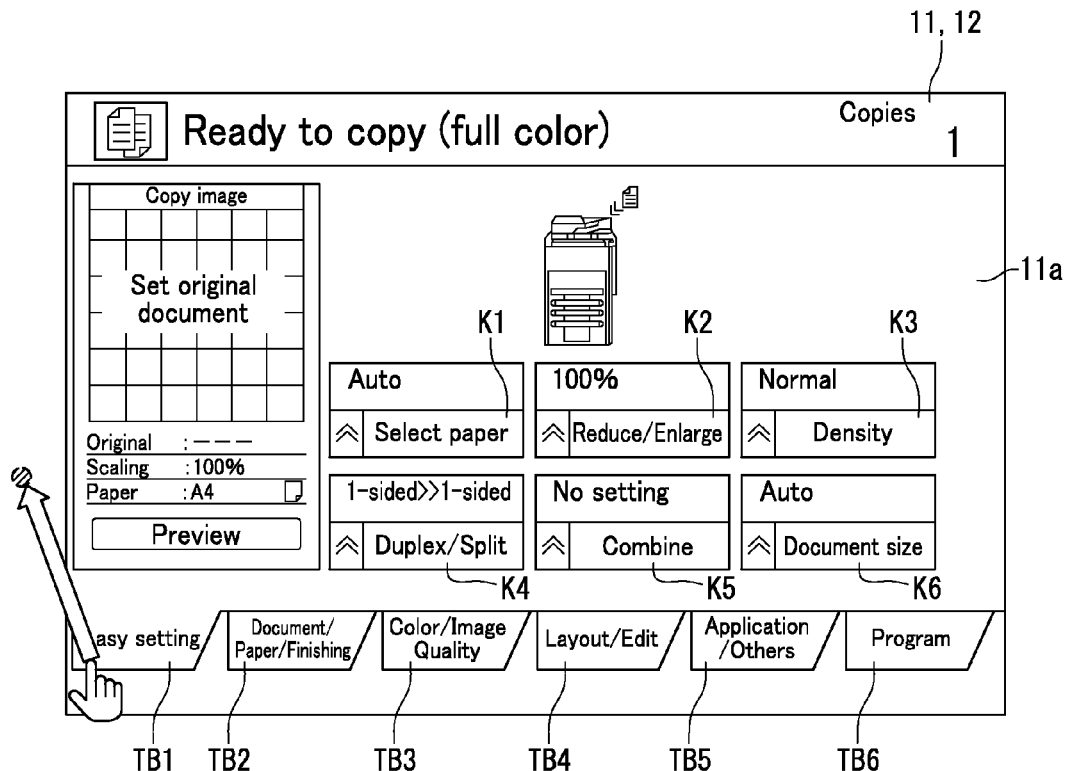
FIG. 8 illustrates an example of detection coordinate data before and after calibration.
FIG. 9 shows an example of the display section in a state where the set of coordinates (position) detected for a touch position falls outside a display region.

With reference to FIGS. 6 to 8, the following describes an example of calibration applied to the detection coordinate data D2 by the operation panel 1 according to the present embodiment. FIG. 6 shows one example of the display section 11 on which a target point image i1 is displayed. FIG. 7 illustrates an example of how an amount of deviation is determined. FIG. 8 illustrates an example of the detection coordinate data D2 before and after calibration.

When a deviation exists between the actual touch position coordinates and the detected touch position coordinates, a touch operation on the display position of a tab may be detected as a touch operation on a position other than the tab as in the example of FIG. 5. Such a detection error may result in that a touch operation on an operation element image fails to cause switching to a desired screen. Alternatively, such a detection error may result in that a touch operation on an operation element image fails to cause any switching so that a screen to be displayed in response to the touch does not appear.

In such a situation, a calibration process needs to be performed for the coordinates to be detected in response to a subsequent touch operation. To this end, on detecting that a touch operation on an image other than any operation element images is performed a predetermined number of times in succession, the panel control section 10 displays on the display section 11 a target point image i1 used for calibrating coordinate detection. Examples of images other than operation element images include images corresponding to non-operable regions, such as blank region, background region, and text region. The predetermined number of times may be any plural number selected by the user. In the operation panel 1 according to the present embodiment, the predetermined number of times is four or five times, for example.

FIG. 6 shows an image of a crosshair with a circle as an example of the target point image i1. However, the target point image i1 is not specifically limited and may alternatively be a circle filled in a specific color, a polygon, or a blinking image. When displaying the target point image i1, the panel control section 10 additionally displays a message indicating that a calibration process will be performed to correct the deviation between the actual touch position coordinates and the detected touch position coordinates. In the examples shown in FIGS. 6 to 11, a message reading "touch position calibration will be made" or a message reading "please touch target point" is displayed by the panel control section 10 in addition to the target point image i1. The message displayed on the display section 11 informs the user that the operation panel 1 is not in the normal mode for selecting an operation element image but in a calibration mode for correcting the deviation between the actual touch position coordinates and the detected touch position coordinates.

The panel control section 10 displays the target point image i1 on the display section 11 when the sets of touch position coordinates detected in response to a predetermined number of successive touch operations all fall within a non-operative region (that is, a touch operation in the non-operable region is repeated the predetermined number of times) and the difference among the predetermined number of sets of touch position coordinates detected in succession is determined to be within a predetermined permissible range. In other words, the target point image it is displayed when the same operation element image is assumed to be operated (touched) repeatedly despite that the sets of coordinates detected all overlap the non-operable region.

In order to do so, the memory 14 stores at least the predetermined number of touch position coordinates detected in succession including a set of touch position coordinates most recently detected. The panel control section 10 determines whether or not a touch operation on the same operation element image is repeated the predetermined number of times based on (1) or (2) below.

(1) The detected sets of touch position coordinates all fall within a region of a size corresponding to any of the operation element images included in the currently displayed screen, with respect to the center of the positions specified by the detected sets of touch position coordinates.

(2) The detected sets of touch position coordinates all fall within a region of an average size of the operation element images included in the currently displayed screen.

On determining that a touch operation on the same operation element image is repeated the predetermined number of times, the panel control section 10 determines, as a set of display coordinates of the target point image i1, one of the sets of touch position coordinates detected in succession or a set of average coordinates of the sets of touch position coordinates detected in succession. The panel control section 10 then displays the target point image i1 at a position overlapping the thus specified set of display coordinates. For example, the panel control section 10 displays the target point image i1 on the display section 11 such that the center or an edge of the target point image i1 coincides with the set of display coordinates.

Subsequently, the panel control section 10 determines the deviation between the set of touch position coordinates detected for the first time after display of the target image i1 and the set of display coordinates of the target point image i1. Specifically, for example, the panel control section 10 detects the deviation between the detected set of touch position coordinates and the set of coordinates specifying the center point of the target point image i1 along the vertical axis as well as along the horizontal axis as shown in FIG. 7. In FIG. 7, the black dot represents an example of the detected touch position. In the example shown in FIG. 7, the set of coordinates detected as the touch position (the black dot) deviates upward along the vertical axis by an amount dy from the actual touch position. In the example shown in FIG. 7, in addition, the set of coordinates detected as the touch position (the black dot) deviates leftward along the horizontal axis by an amount dx from the actual touch position. The panel control section 10 detects the amounts dy and dx as the amount of deviation.

The detection coordinate data D2 is stored in the memory 14 as described above. The detection coordinate data D2 defines: a plurality of coordinate values on the vertical axis (y axis) each of which is taken by the panel control section 10 as the touch position coordinate upon receipt of a corresponding output value indicating a vertical axis coordinate (y coordinate) from the touch screen section 12; and a plurality of coordinate values on the horizontal axis (x axis) each of which is taken by the panel control section 10 as the touch position coordinate upon receipt of a corresponding output value indicating a horizontal axis coordinate (x coordinate) from the touch screen section 12. Then, the panel control section 10 calibrates the detection coordinate data D2 as shown in FIG. 8 such that each set of coordinates subsequently detected is corrected in accordance with the amount of deviation.

In FIG. 8, $\alpha$ denotes the calibration amount (the amount by which corresponding deviation is corrected) in the horizontal (x) axis direction, and $\beta$ denotes the calibration amount in the vertical (y) axis direction. Whether each of $\alpha$ and $\beta$ takes on a positive value or a negative value is determined depending on the direction of deviation. More specifically, the calibration amount $\beta$ takes a negative value when the vertical axis coordinate of the detected touch position deviates upward from the actual touch position (the vertical axis coordinate of the target point image i1) by the deviation amount dy, and takes a positive value when deviates downward. In addition, the calibration amount $\alpha$ takes a positive value when the horizontal axis coordinate of the detected touch position deviates leftward from the actual touch position (the horizontal axis coordinate of the target point image i1) by the deviation amount dx, and takes a negative value when deviates rightward. In other words, the panel control section 10 calibrates the coordinate values included in the detection coordinate data D2 by adding or subtracting the absolute value of the corresponding deviation amount, thereby eliminating the deviation.

When Display Coordinates of Target Point Image i1 Falls Outside Display Region

Figure 10:
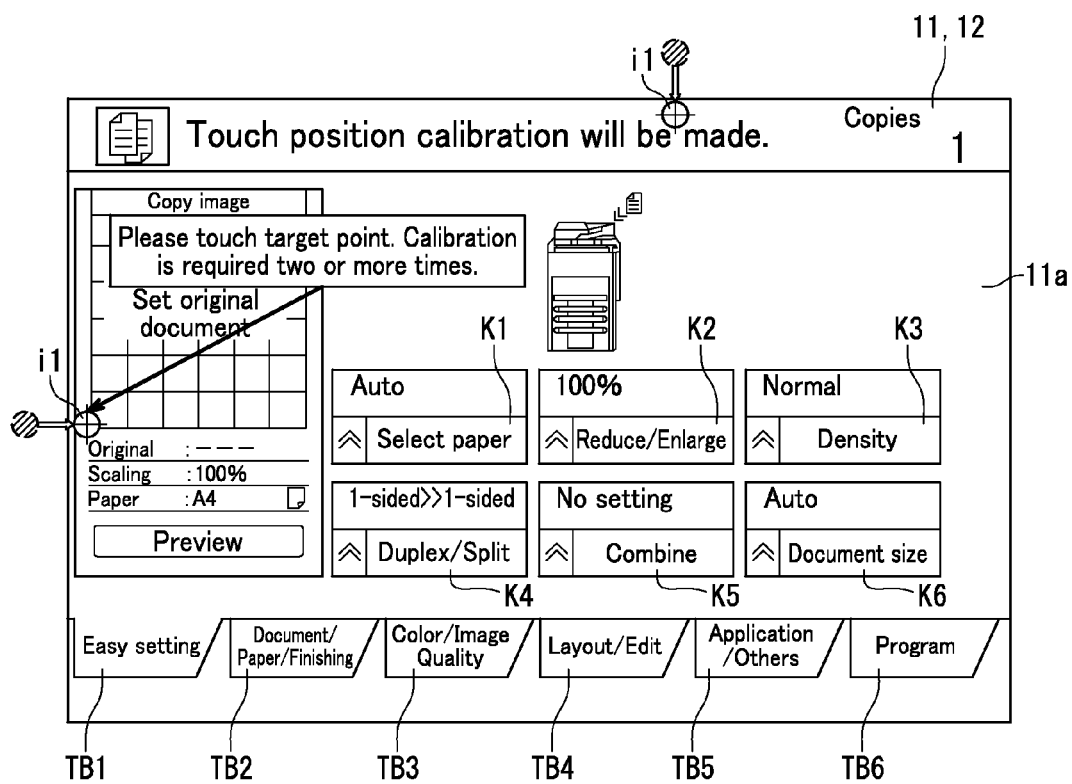
FIG. 10 illustrates an example in which the display coordinates of a target point image are corrected to specify a position within the display region of the display section.
Figure 11:
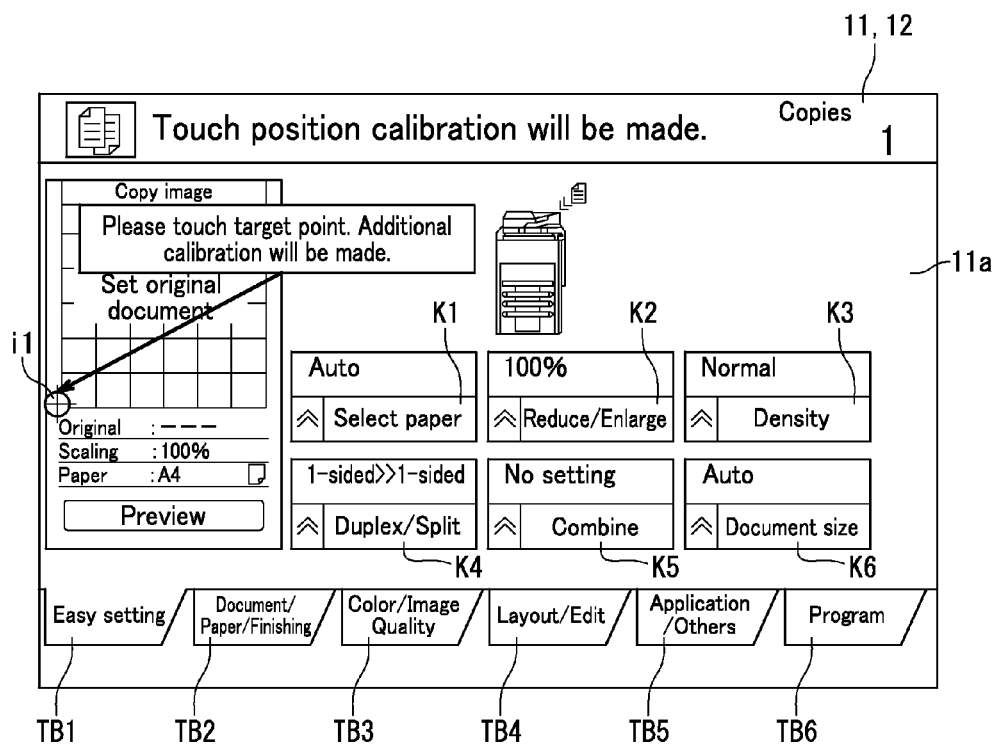
FIG. 11 illustrates an example in which the target point image is displayed back on the display section.

With reference to FIG. 2 and FIGS. 9 to 11, the following describes the display section 11 in the state where the determined set of display coordinates of the target point image i1 falls outside the display region of the display section 11. FIG. 9 shows an example of the display section 11 in a state where the detected set of touch position coordinates (position) falls outside the display region. FIG. 10 illustrates an example of a process of correcting the set of display coordinates of the target point image i1 such that the corrected set of display coordinates falls in the display region of the display section 11. FIG. 11 illustrates an example of a process for displaying the target point image i1 back on the display screen.

As shown in FIG. 2, the display section 11 of the operation panel 1 according to the present disclosure is provided with a decorative cover. The decorative cover has an opening through which the display region of the display section 11 is exposed. The opening serves as the outer frame of the display region of the display section 11. However, the display surface of the display section 11 is not equal in size to the opening in the decorative cover. Rather, the display surface has an area (region) larger than the opening. Note that the panel of the display section 11 is a component that may be common among a plurality of models and may be used with a decorative cover having a larger opening. For this reason, the detection coordinate data D2 includes coordinate values specifying a position in a non-viewable region (region not exposed from the opening in the decorative cover) of the display section 11 as coordinate values corresponding to output values of the touch screen section 12. Therefore, the detection coordinate data D2 includes a predetermined setting of a range of vertical axis coordinates and a range of horizontal axis coordinates falling within the display region of the display section 11.

However, when a deviation exists between the actual touch position coordinates and the detected position coordinate, a set of coordinates falling outside the display region of the display section 11 may be detected as a position of a touch operation performed by a user. In the example shown in FIG. 9, although the user actually touches the display position of an easy setting tab, a set of coordinates specifying a position outside the display region of the display section 11 rather than a position on the easy setting tab is detected by the panel control section 10 based on output of the touch screen section 12. When detecting the coordinates falling outside the display region of the display section 11, the panel control section 10 determines that a touch operation is made in the non-operative region. As has been described above, since the panel control section 10 detects a touch position based on output of the touch screen section 12, a set of coordinates falling outside the display region of the display section 11 may be detected as a touch position.

When detecting a set of coordinates falling outside the display region of the display section 11 as a touch position, the panel control section 10 determines that the detected set of touch position coordinates specifies a position in a non-operative region (that a non-operative region is touched). When a predetermined number of sets of touch position coordinates detected in succession all fall within a non-operative region and the difference among the sets of touch position coordinates detected in succession all fall within a predetermined permissible range, the panel control section 10 assumes that a touch operation on the same operation element image is repeated the predetermined number of times and therefore displays the target point image i1 on the display section 11. The panel control section 10 provisionally determines, as the set of display coordinates of the target point image i1, one of the sets of touch position coordinates detected in succession or a set of average coordinates of the sets of touch position coordinates detected in succession.

Note that the set of display coordinates determined in this case specifies a position outside the display region of the display section 11. Therefore, the target point image i1 cannot be displayed at the position specified by the determined set of display coordinates. In view of the above, when the set of display coordinates provisionally determined falls outside the display region of the display section 11, the panel control section 10 corrects either or both of the vertical axis coordinate and the horizontal axis coordinate of the set of display coordinates through a predetermined procedure and displays the target point image i1 within the display region of the display section 11 based on the set of display coordinates as corrected.

With reference to FIG. 10, the following describes the processing for correcting the display coordinates of the target point image i1 to specify a position within the display region of the display section 11. More specifically, when the vertical axis coordinate value of the provisionally determined set of display coordinates falls outside the display region of the display section 11, the panel control section 10 corrects the vertical axis coordinate value to specify such a position that the target point image i1 is displayed on a closer one of the two horizontal edges of the display region. That is, the vertical axis coordinate of the target point image i1 shown above the display region in FIG. 10 is changed. More specifically, when displaying the target point image i1 at a position where the center of the target point image i1 coincides with the set of display coordinates, the panel control section 10 corrects the vertical axis coordinate value by adding or subtracting the sum of half the vertical length of the target point image i1 and the distance to the horizontal edge that is closer to the vertical axis coordinate before the correction. Through the correction, when the provisionally determined set of display coordinates specifies a position outside the display region of the display section 11 in terms of the vertical axis direction, the target point image i1 is displayed on the closer horizontal edge of the display region.

Similarly, when the horizontal axis coordinate value of the provisionally determined set of display coordinates falls outside the display region of the display section 11, the panel control section 10 corrects the horizontal axis coordinate value to specify such a position that the target point image i1 is displayed on a closer one of the two vertical edges of the display region. That is, the horizontal axis coordinate of the target point image i1 shown on the left of the display region in FIG. 10 is changed. More specifically, when displaying the target point image i1 at a position where the center of the target point image i1 coincides with the set of display coordinates, the panel control section 10 corrects the horizontal axis coordinate value by adding or subtracting the sum of half the horizontal length of the target point image i1 and the distance to the vertical edge that is closer to the horizontal axis coordinate before the correction. Through the correction, when the provisionally determined set of display coordinates specifies a position outside the display region of the display section 11 in terms of the horizontal axis direction, the target point image i1 is displayed on the closer vertical edge of the display region.

Note when both the vertical axis and coordinate and the horizontal axis coordinate of the provisionally determined set of display coordinates both fall outside the display region of the display section 11, the panel control section 10 corrects both the coordinate values in a manner described above. In such a case, the target point image i1 is displayed at a corner of the display region of the display section 11.

The panel control section 10 then determines the deviation between the set of touch position coordinates detected for the first time after display of the target image i1 and the set of display coordinates of the target point image i1. The panel control section 10 calibrates the detection coordinate data D2 in accordance with the deviation amount in the manner described above.

At the time when the target point image i1 is displayed at the set of displayed coordinates as corrected, the deviation may have not been fully corrected yet. In view of the possibility, when displaying the target point image i1 at the coordinates having been corrected, the panel control section 10 displays on the display section 11 a message as shown in FIG. 10 indicating that a calibration process needs to be performed a plurality of times (two or more times) to correct the deviation between the actual touch position coordinates and the detected touch position coordinates.

After completing the calibration process on the detection coordinate data D2 for the first time, the panel control section 10 starts an additional calibration process. In the additional calibration process, the panel control section 10 displays the target point image i1 at a predetermined set of coordinates after display of the target point image i1 is once turned off upon completion of the first calibration process on the detection coordinate data D2.

The set of display coordinates used in the additional calibration process may be appropriately determined. For example, the set of display coordinates used in the additional calibration process may be the same as the coordinates (position) at which the target point image i1 is displayed for the first calibration process (before the additional calibration process). In such a case, the target point image i1 disappears from the screen for correction based on a touch operation on the target point image i1 displayed at the initial display position, and appears again at the same coordinates upon start of the additional calibration process. In one example, the display coordinates specifying the center point of the display section 11 may be determined in advance for use in the additional calibration process. In such a case, the target point image i1 once disappears for correction based on a touch operation on the target point image i1 displayed at the initial display position, and appears again upon start of the additional calibration process at a position where the center point of the target point image i1 (the center coordinates of the target point image i1) coincides with the center point of the display region (the center coordinates of the display region) of the display section 11.

With respect to the operation panel 1 according to the present embodiment, the additional calibration process is performed once. Alternatively, however, the additional calibration process may be repeated two or more time to further reduce or eliminate the deviation.

The procedure for the additional calibration process is the same as the first calibration process performed to correct the touch position deviation. More specifically, the panel control section 10 determines the deviation amount based on the set of touch position coordinate detected for the first time after display of the target image i1 once again for the additional calibration process. The panel control section 10 then calibrates the detection coordinate data D2 based on the determined deviation amount in the same manner as described above.

Figure 12:
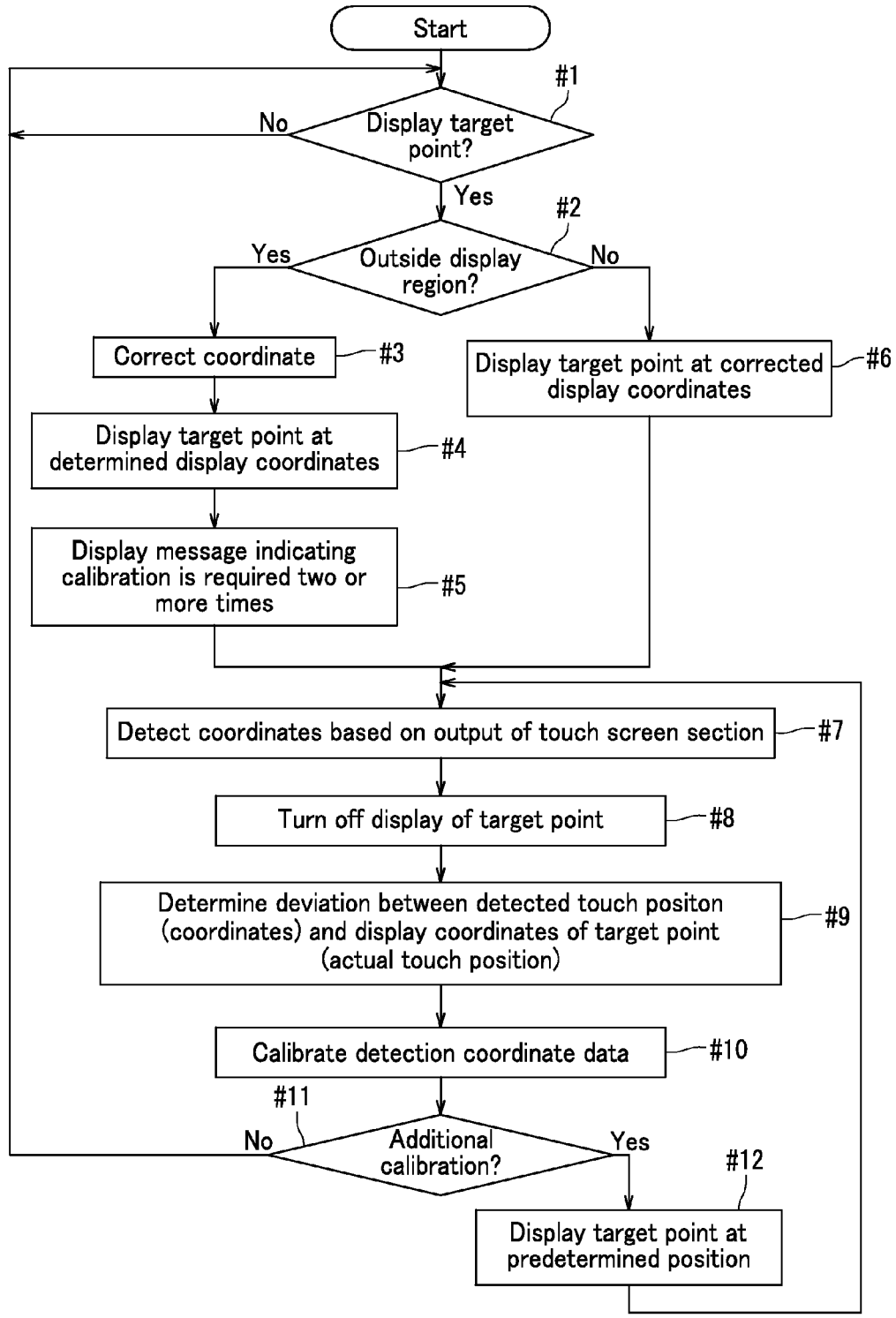
FIG. 12 is a flowchart of an example flow of a calibration process of correcting the deviation between the coordinates specifying a touch position on the operation panel and the coordinates detected for the touch position.

Flow of Calibration of Deviation Between Touch Position and Detected Coordinates Next, with reference to FIG. 12, the following describes an example flow of the calibration process of correcting the deviation between the coordinates specifying a touch position on the operation panel 1 according to the present embodiment and the coordinates detected for the touch position. FIG. 12 is a flowchart of an example flow of the calibration process of correcting the deviation between the coordinates specifying a touch position on the operation panel 1 according to the present embodiment and the coordinates detected for the touch position.

The process shown in FIG. 12 starts when the multifunction peripheral 100 (operation panel 1) is activated as a result that the main power is turned on or that power supply is resumed through reversion to the power-save mode.

The panel control section 10 determines whether or not the conditions for displaying the target point image i1 are satisfied (step #1). As has been described above, the panel control section 10 displays the target point image i1 when the conditions below are satisfied:

the predetermined number of sets of touch position coordinates detected in succession all fall within a non-operative region; and the difference among the predetermined number of sets of touch position coordinates is within the permissible range (which indicates that the same operation element image is repeatedly operated).

Note, however, that the latter condition that the difference among the sets of touch position coordinates is within the permissible range may be made an optional condition for displaying the target image i1. That is, the target point image i1 may be displayed only on condition that the predetermined number of sets of touch position coordinates detected in succession all specify positions within the non-operative region. If the target point image i1 is displayed when not necessary, a single touch operation on the target point image i1 causes the mode switching back into the normal mode. Therefore, any possible disadvantage and inconvenience to the user is kept to a minimum.

When the coordinates detected as a touch position overlaps the display position of any of the operation element images (key or tab), the panel control section 10 determines that the conditions for displaying the target point image i1 are not satisfied and resets the count for the predetermined number of times. In this case, the panel control section 10 switches the screen image currently displayed on the display section 11 to another screen image according to the operation element image operated.

When the conditions for displaying the target point image i1 are not satisfied (step #1: No), the panel control section 10 continues to check whether or not the conditions for displaying the target point image i1 are satisfied (step #1: No→step #1).

When the conditions for displaying the target point image i1 are satisfied (step #1: Yes), the panel control section 10 determines the set of display coordinates for the target point image i1 and checks whether or not the determined set of display coordinates falls outside the display region of the display section 11 (step #2). When the determined set of display coordinates falls outside the display region of the display section 11 (step #2: Yes), the panel control section 10 corrects the set of display coordinates of the target point image i1 (step #3). The panel control section 10 displays the target point image i1 at a position overlapping the set of display coordinates as corrected (in a manner that the center of the target point image i1 coincides with the set of display coordinates) (step #4). The operation panel 1 displays, on the display section 11, a message indicting that the calibration process needs to be performed a plurality of times (step #5).

When the set of display coordinates determined for the target point image i1 does not fall outside the display region (step #2: No), the panel control section 10 displays the target point image i1 at a position overlapping the determined set of display coordinates (in a manner that the center of the target point image i1 coincides with the set of display coordinates) (step #6).

After step #5 or #6, the panel control section 10 detects based on output of the touch screen section 12 that a touch operation on the target point image i1 is made by a user (step #7). Subsequently, the panel control section 10 causes the display section 11 to turn off the display of the target point image i1 (step #8). The display of the target point image i1 is turned off because the target point image i1 remaining on may result in that the user misunderstands as being requested to repeat a touch operation on the target point image i1 and consequently performs a useless touch operation. When turning off the display of the target point image i1, the panel control section 10 also turns off the message from the display section 11.

The panel control section 10 then determines the deviation between the set of display coordinates of the target point image i1 (actual touch position) and the detected position (coordinates) (step #9). The panel control section 10 then calibrates the detection coordinate data D2 in accordance with the deviation (step #10).

The panel control section 10 then determines whether or not an additional calibration process is necessary (step #11). On determining that the additional calibration process is necessary (step #11: Yes, the set of display coordinates is corrected), the panel control section 10 again turns on display of the target point image i1 at a predetermined set of coordinates (step #12). The processing then goes back to step #7. On the other hand, on determining that the additional calibration process is not necessary (step #11: No), the processing goes back to step #1. In other words, the user performs operations on the operation panel 1 (the touch screen section 12) in the normal mode.

As described above, the display and input device (the operation panel 1) according to the present embodiment includes the display section 11, the touch screen section 12, the control section (the panel control section 10), and the storage section (the memory 14). The display section 11 displays a screen image including one or more operation element images each operable to cause switching of the screen image. The touch screen section 12 is layered on the display section 11 and a touch position on the screen image. The control section (the panel control section 10) detects a set of touch position coordinates of the touch position based on output from the touch screen section 12. The control section (the panel control section 10) then compares the detected set of touch position coordinates with the image data D1 of the screen image displayed on the display section 11 to determine that when a display position of any of the operation element images overlaps with the detected set of touch position coordinates, the overlapping operation element image is operated. The control section (the panel control section 10) then causes switching of the screen image displayed on the display section 11 according to the operation element image operated. The storage section (the memory 14) stores therein: the detection coordinate data D2 showing coordinate values associated with possible output values of the touch screen section 12; and at least a predetermined number of sets of touch position coordinates detected in succession including a set of touch position coordinates most recently detected. On detecting a touch operation in the non-operable region the predetermined number of times in succession, the control section (the panel control section 10) displays on the display section 11 a target point image i1 for calibrating coordinate detection, determines an amount of deviation between a set of touch position coordinates detected after display of the target point image i1 and a set of display coordinates of the target point image i1, and calibrates the detection coordinate data D2 such that each set of touch position coordinates subsequently detected is corrected in accordance with the amount of deviation.

In the normal mode, a user operates the multifunction peripheral 100 through a touch operation at a position corresponding to the display coordinates of an operation element image (a key or a tab, for example) displayed on the display section 11. When a user performs a touch operation on an operation element image, the coordinates of a position detected as the touch position coincides with the set of display coordinates of the operation element image provided that there is no deviation. When, a touch operation on a non-operable element image is repeated a predetermined number of times in succession, it means that a useless operation is repeated. The presence of a deviation between the actual touch position coordinates and the detected touch position coordinates may result in determination that a touch operation on a non-operable element image is repeated, although the user correctly touches the key or tab that the user intends to operate (the set of display coordinates that the user intends to touch). To address the above, on detecting a touch operation in the non-operable region the predetermined number of times in succession, the control section (the panel control section 10) displays on the display section 11 a target point image i1 for calibrating coordinate detection and calibrates the detection coordinate data D2. Consequently, the target point image i1 is automatically displayed for calibrating coordinate detection when the user receives no response to the push (touch) operations that the user has repeated. Consequently, when a deviation exists between the actual touch position coordinates and the detected position coordinates, the deviation is promptly corrected simply through an operation of touching the set of display coordinates of the target point image i1 and without having to go through complicated operations. The predetermined number of times can be appropriately selected. The predetermined number of times may for example be two or more times. In order to avoid displaying the target point image i1 in response to a touch operation of touching a non-operable element image merely by an error, the predetermined number of times may for example be four or five times.

When a touch operation on substantially the same position is repeated in succession, the disparity among the sets of coordinates detected for the successive touch operations is typically small. Therefore, when a touch operation on a non-operable element image (blank, for example) is detected in succession, it is highly likely that the detection is in error due to the deviation between the actual touch position coordinates and the detected touch position coordinates and that the user actually touches the set of display coordinates of a specific key or tab that the user intends to operate. To address the above, when the predetermined number of sets of touch position coordinates detected in succession all fall within the non-operable region and the difference among the predetermined number of sets of touch position coordinates is within a predetermined permissible range, the control section (the panel control section 10) determines, as the set of display coordinates, one of the predetermined number of sets of touch position coordinates detected in succession or a set of average coordinates of the predetermined number of sets of touch position coordinates detected in succession. The control section (the panel control section 10) then displays the target point image i1 at a position overlapping the determined set of display coordinates.

With this configuration, the target point image i1 is automatically displayed to perform calibration when there is high necessity for correcting the deviation between the actual touch position coordinates and the detected touch position coordinates. In addition, the target point image i1 is displayed at a position in the close vicinity of the touch position coordinates detected by the system in response to the successive touch operations. This serves to inform the user about the position that detected by the display and input device (operation panel 1) as being touched.

When the determined set of display coordinates falls outside the display region of the display section 11, the control section (panel control section 10) corrects either or both of a vertical axis coordinate and a horizontal axis coordinate of the determined set of display coordinates through a predetermined procedure to specify such a position that the target point image i1 is displayed in the display region of the display section 11. The control section (the panel control section 10) then displays the target point image i1 at the set of display coordinates as corrected.

Consequently, when the set of display coordinates specifies a position outside the display region of the display section 11 due to the deviation between the actual touch position coordinates and the detected touch position coordinates, the target point image i1 is ensured to be displayed in the display region of the display section 11.

When the vertical axis coordinate of the determined set of display coordinates falls outside the display region of the display section 11, the control section (the panel control section 10) corrects the vertical axis coordinate to specify such a position that the target point image i1 is displayed on a closer one of the two horizontal edges of the display region. When the horizontal axis coordinate of the set of display coordinates falls outside the display region of the display section 11, the control section (the panel control section 10) corrects the horizontal axis coordinate to specify such a position that the target point image i1 is displayed on a vertical edge of the display region, the vertical edge being a closer one of the two vertical edges of the display region.

Consequently, when the set of display coordinates specifies a position outside the display region of the display section 11 due to the deviation between the actual touch position coordinates and the detected touch position coordinates, the target point image i1 is ensured to be displayed in the possible closest vicinity of the position that detected by the display and input device (operation panel 1) as being touched.

When displaying the target point image i1 at the set of display coordinates as corrected, the control section (the panel control section 10) additionally displays on the display section 11 a message indicating that a calibration process needs to be performed a plurality of times. Then, the control section (operation panel 10) performs a first calibration process of the detection coordinate data D2 based on a set of touch position coordinates detected with respect to the target point image i1 displayed at the set of display coordinates as corrected. After performing the first calibration process, the control section (operation panel 1) displays the target point image i1 at the predetermined set of display coordinates and performs an additional calibration process of the detection coordinate data D2 one or more times, based on a set of touch position coordinates detected after display of the target point image i1 at the predetermined set of display coordinates.

The deviation may not be fully collected by performing a calibration process performed only once in response in response to display of the target point image i1 at the set of display coordinates as corrected. In view of this, when the deviation is not fully collected by performing the calibration process only once, an additional calibration process is performed to at least further reduce the deviation.

The image forming apparatus (multifunction peripheral 100) includes the display and input device (operation panel 1). This enables the image forming apparatus (multifunction peripheral 100) to produce the advantageous same effects as the display and input device (operation panel 1).

The embodiment of the present disclosure has been described. However, the scope of the present disclosure is not limited to the specific embodiment. Various alterations may be made to practice the present disclosure without departing from the essence of the present disclosure.

What is claimed is:

1. A display and input device comprising:
   a display section configured to display thereon a screen image including
      one or more operation element images each operable to cause switching of the screen image and
      a non-operable region in which no operation element image is present;
   a touch screen section configured to detect a touch position on the screen image;
   a control section configured to
      detect a set of touch position coordinates of the touch position based on output from the touch screen section,
      compare the detected touch position coordinates with image data of the screen image displayed on the display section to determine that when a display position of any of the operation element images overlaps the detected touch position coordinates, the overlapping operation element image is operated, and
      control the display section to switch the screen image according to the operation element image operated; and
   a storage section configured to store therein
      detection coordinate data showing coordinate values associated with possible output values of the touch screen section and
      at least a predetermined number of sets of touch position coordinates detected in succession including a set of touch position coordinates most recently detected, wherein
   the display and input device uses a normal mode for selecting any of the one or more operation element images and a calibration mode for correcting the detection coordinate data,
   on detecting a touch operation in the non-operable region the predetermined number of times in succession, the control section switches modes from the normal mode to the calibration mode, additionally displays on the display section a target point image for calibrating coordinate detection other than the one or more operation element images in the calibration mode, determines an amount of deviation between a set of touch position coordinates detected after display of the target point image and a set of display coordinates of the target point image, and calibrates the detection coordinate data such that each set of touch position coordinates subsequently detected is corrected in accordance with the amount of deviation.

2. The display and input device according to claim 1, wherein
   when the predetermined number of sets of touch position coordinates detected in succession all fall within the non-operable region and a difference among the predetermined number of sets of touch position coordinates is within a predetermined permissible range, the control section
      determines, as the set of display coordinates, one of the predetermined number of sets of touch position coordinates detected in succession or a set of average coordinates of the predetermined number of sets of touch position coordinates detected in succession and displays the target point image at a position overlapping the determined set of display coordinates.

3. The display and input device according to claim 2, wherein when the determined set of display coordinates falls outside a display region of the display section, the control section corrects either or both of a vertical axis coordinate and a horizontal axis coordinate of the determined set of display coordinates through a predetermined procedure to specify such a position that the target point image is displayed in the display region of the display section and displays the target point image at the set of display coordinates as corrected.

4. The display and input device according to claim 3, wherein when the vertical axis coordinate of the determined set of display coordinates falls outside the display region of the display section, the control section corrects the vertical axis coordinate to specify such a position that the target point image is displayed on a horizontal edge of the display region, the horizontal edge being a closer one of two horizontal edges to the vertical axis coordinate before the correction, and when the horizontal axis coordinate of the set of display coordinates falls outside the display region of the display section, the control section corrects the horizontal axis coordinate to specify such a position that the target point image is displayed on a vertical edge of the display region, the vertical edge being a closer one of two vertical edges to the horizontal axis coordinate before the correction.

5. The display and input device according to claim 3, wherein when displaying the target point image at the set of display coordinates as corrected, the control section additionally displays on the display section a message indicating that a calibration process needs to be performed a plurality of times, after performing a first calibration process of the detection coordinate data based on a set of touch position coordinates detected with respect to the target point image displayed at the set of display coordinates as corrected, the control section displays the target point image at a predetermined set of display coordinates and performs an additional calibration process one or more times, and the additional calibration process is performed based on a set of touch position coordinates detected after display of the target point image at the predetermined set of display coordinates.

6. An image forming apparatus comprising the display and input device according to claim 1.

7. The display and input device according to claim 1, wherein when displaying the target point image on the display section in the calibration mode, the control section displays on the display section a message indicating that a calibration process will be performed to correct the detection coordinate data.

8. The display and input device according to claim 1, wherein the predetermined number of times the touch operation is detected is a plural number of times.

* * * * *